(12) United States Patent
Nakamura et al.

(10) Patent No.: US 6,611,505 B1
(45) Date of Patent: Aug. 26, 2003

(54) CONTROL SIGNAL PROCESSOR AND COMMUNICATION SYSTEM

(75) Inventors: Shin Nakamura, Yokohama (JP); Hiroki Morikawa, Zushi (JP); Masatomo Nakano, Yokosuka (JP)

(73) Assignee: NTT Mobile Communcations Networks, Inc., Tokyo (JP)

( * ) Notice: Subject to any disclaimer, the term of this patent is extended or adjusted under 35 U.S.C. 154(b) by 0 days.

(21) Appl. No.: 09/230,218
(22) PCT Filed: May 22, 1998
(86) PCT No.: PCT/JP98/02260
§ 371 (c)(1), (2), (4) Date: Jan. 19, 1999
(87) PCT Pub. No.: WO98/56205
PCT Pub. Date: Dec. 10, 1998

(30) Foreign Application Priority Data

Jun. 2, 1997 (JP) ............................................. 9-144261

(51) Int. Cl.⁷ ................................................. H04Q 7/00
(52) U.S. Cl. ..................... 370/329; 370/341; 370/349
(58) Field of Search ................................ 370/321, 328, 370/329, 336, 338, 341, 349, 345, 347, 337, 442, 216, 217, 218, 219, 220–228, 395.1, 396, 399, 395.5

(56) References Cited

U.S. PATENT DOCUMENTS

| | | | | |
|---|---|---|---|---|
| 5,241,534 A | * | 8/1993 | Omuro et al. | 370/218 |
| 5,655,215 A | * | 8/1997 | Diachina et al. | 455/426 |
| 5,815,816 A | * | 9/1998 | Isumi | 455/445 |
| 5,822,311 A | * | 10/1998 | Hassan et al. | 370/322 |
| 5,896,376 A | * | 4/1999 | Alperovich et al. | 340/825.51 |
| 5,926,469 A | * | 7/1999 | Norstedt et al. | 370/329 |
| 5,940,763 A | * | 8/1999 | Alperovich et al. | 370/337 |
| 6,151,482 A | * | 11/2000 | Eriksson | 455/67.1 |
| 6,167,248 A | * | 12/2000 | Hamalainen et al. | 455/403 |

FOREIGN PATENT DOCUMENTS

| | | |
|---|---|---|
| JP | 3-011831 A | 1/1991 |
| JP | 5-336198 A | 12/1993 |

* cited by examiner

*Primary Examiner*—Chau Nguyen
*Assistant Examiner*—Soon-Dong Hyun
(74) *Attorney, Agent, or Firm*—Brinks Hofer Gilson & Lione

(57) ABSTRACT

The invention reduces an overhead operation required for re-establishment of a physical signal link. A physical signal link (layer 1 link) is switched over keeping a layer 2 link in the OSI reference model. A database 11 stores information indicating physical signal links and information indicating the maximum length of a layer 2 frame determined according to the ability of physical signal links. When a physical signal link is to be switched over, a target physical signal link is selected and a physical signal link used by the link is switched to the target physical link without releasing the single layer 2 link. The maximum length corresponding to the target physical signal link is obtained from the database 11, and layer 2 frames having the maximum length are transmitted. Switching over a physical signal link is performed in the following manner. When a physical signal link switching-over request is given, establishment of a target physical signal link is required without releasing a layer 2 link, and a multi-reception of control signals using both of the target physical signal link and an original physical signal link is started. After confirming establishment of the target physical signal link, a physical signal link used for transmitting a control signal is switched to the target physical signal link and release of the original physical signal link is required. After confirming release of the original physical signal link, a physical signal link for receiving a control signal is switched to the target physical signal link.

8 Claims, 8 Drawing Sheets

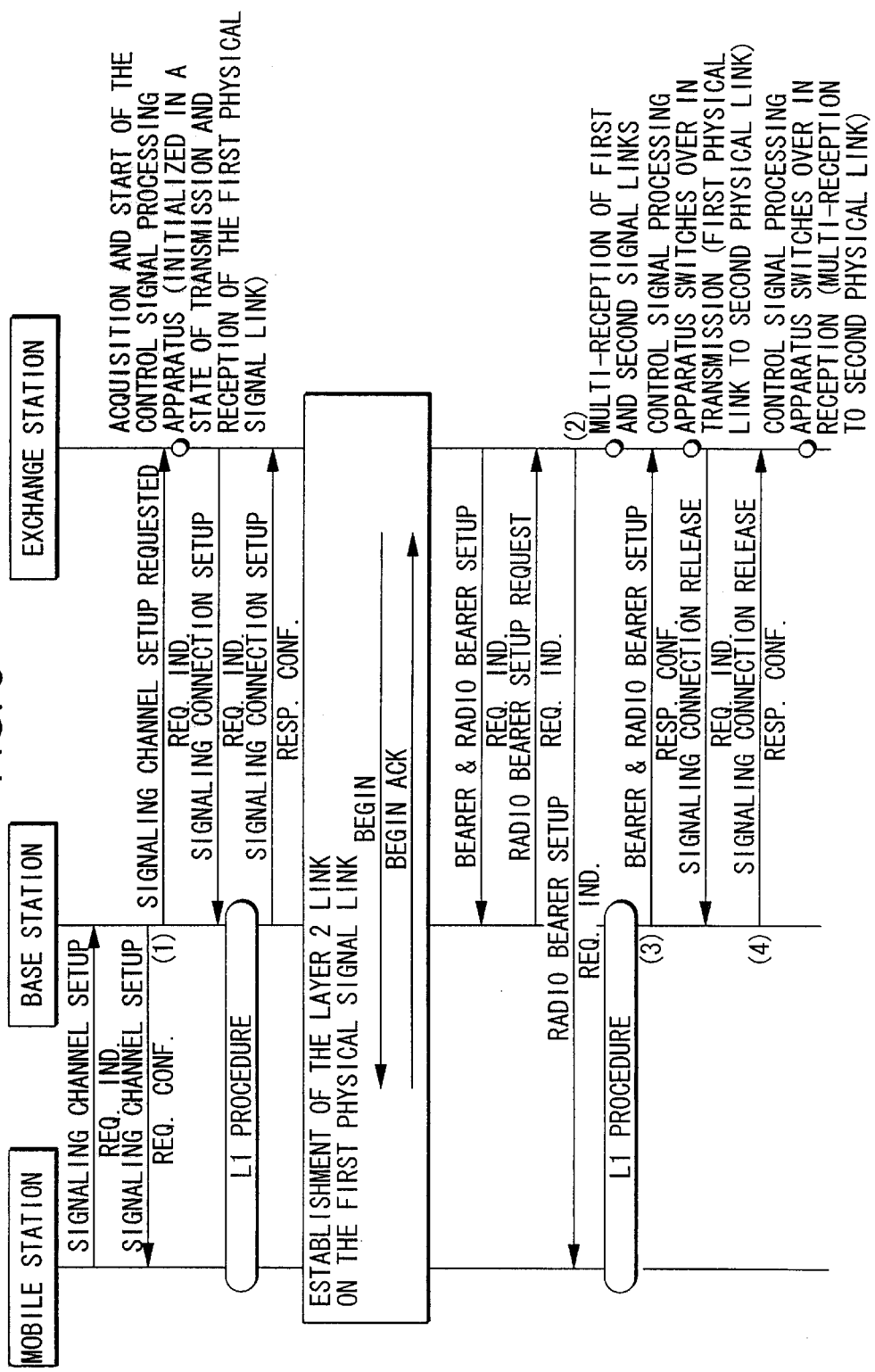

CONTROL SIGNAL PROCESSOR AND COMMUNICATION SYSTEM

TECHNICAL FIELD

The present invention relates to a communication system corresponding to an OSI (Open Systems Interconnection) reference model composed of layers 1 to 7, and to a control signal processing apparatus for sending and receiving a frame containing control information through the layer 1 link (physical signal link) and the layer 2 link (logical link), and a communication system including the same control signal processing apparatus.

BACKGROUND ART

In a next-generation mobile radio communication network, it is expected that a network performs an authentication process on a user (caller) at the time of calling. In the authentication process, authentication information is exchanged between a mobile station and a network when connecting the mobile station to the network, but the authentication information results in being fairly great in quantity in order to prevent an illegal utilization. In order to shorten a connection delay, it must not take a long time to exchange the authentication information. In a next-generation mobile radio communication network, therefore, it is necessary to heighten the ability (physical data transfer rate) of the layer 1 link (physical signal link) used in calling and to exchange the authentication information in a short time between a mobile station and the network.

After a connecting process has been finished and a mobile station comes into a communicatable state, however, the quantity of control information to be exchanged between the mobile station and the network side is a little, and therefore a required ability of the physical signal link becomes remarkably lower in comparison with that at the time of originating a call.

Accordingly, at the present time, a communication method is being examined which allocates a temporary physical signal link to a user at the time of originating a call and then allocates newly a physical signal link lower in ability instead of the temporary physical signal link after validity of the call has been confirmed by an authentication process.

Furthermore, a communication method is being examined which can not only perform such a control at the time of originating a call but also perform switching over of a physical signal link without delay in response to a requirement from signal processing performed by an upper layer process and effectively utilize a limited channel resource.

Meanwhile, when performing such "switching over of a physical signal link" using with a conventional method for switching over a physical signal link in a mobile radio communication network, it is necessary to release once an established layer 2 link (logical link) and then newly re-establish the layer 2 link.

If a physical signal link switching-over method accompanied by such switching over of the layer 2 link is applied to a next-generation mobile radio communication network, however, it is necessary to release and re-establish the layer 2 link each time a physical signal link is re-established, and so a problem happens that an overhead operation is increased.

Furthermore, if the layer 2 link is re-established when a physical signal link is re-established, the information (frame) lost at the time of releasing the layer 2 link is not retransmitted in a new layer 2 link. Therefore, it is a possibility that an upper layer 3 signal (message) disappears and the control procedure reaches a deadlock.

DISCLOSURE OF INVENTION

The present invention has been provided in consideration of the above-mentioned circumstances, and a first object of it is to provide a control signal processing apparatus and a communication system capable of switching over a physical signal link for sending and receiving a control signal with a little overhead operation.

A second object of the invention is to reduce to the utmost a frame loss at the time of re-establishing a physical signal link.

In order to solve the above-mentioned problems, the present invention provides a control signal processing apparatus which has a control function for managing establishment and maintenance of a physical signal link and a logical link, and sends and receives frames including control signals through a physical signal link and a logical link which have been established, said control signal processing apparatus comprising;

a physical signal link switching-over means for switching over a physical signal link to be used in sending and receiving a control signal to a new physical signal link without releasing a logical link in response to a physical signal link switching-over request requiring to switch over a physical signal link to another physical signal.

According to this invention, since a physical signal link is switched over without releasing a logical link, it is possible to reduce an overhead operation for switching the physical signal link.

Examples of switching over a physical signal link are as follows:

a. A physical signal link switching over request is generated when a call is originated and an information channel has been established. A physical signal link for sending and receiving a control signal is then switched over to another physical signal link having a less capacity.

b. A physical signal link switching-over request is generated when performing a switching over of a bearer. A physical signal link for sending and receiving a control signal is then switched over to a physical signal link corresponding to a new bearer obtained after switching over.

c. A physical signal link switching-over request is generated when a plurality of calls are in communication and a call using a physical signal link for sending and receiving a control signal is finished. A physical signal link for sending and receiving a control signal is then switched over to a physical signal link corresponding to one of the remaining calls.

In a preferred embodiment of the invention, when a physical signal link switching-over request is given, the physical signal link switching-over means performs:

requesting establishment of a target physical signal link without releasing the logical link and starting to receive control signals using both of the target physical signal link and the original physical signal link;

switching over a physical signal link to be used for sending a control signal to the target physical signal link and requesting release of the original physical signal link after confirming that the target physical signal link has been established; and switching over a physical signal link for receiving a control signal to only the target physical signal link after confirming that the original physical signal link has been released.

In this embodiment of the invention, since control signals are sent and received using both of a target physical signal link and an original physical signal link until the original physical link is released after the target physical signal link has been established, it is possible to avoid to the utmost a frame loss which may be caused by the switching over of a physical signal link.

In another preferred embodiment of the invention, a control signal processing apparatus further comprises:

- a database for storing maximum frame length of each of available physical signal links;
- selecting means for selecting a target physical signal link when said physical signal link switching-over request is given; and
- a transmitting means for obtaining the maximum length corresponding to said target physical signal link from said database and for transmitting one or more frames having the maximum frame length and including the control signal.

In this embodiment of the invention, since it is possible to send a frame having the maximum length adapted to a physical signal link throughout before and after switching over the physical signal link, a high transmission efficiency can be kept even in case of switching over a physical signal link.

A control signal processing apparatus according to another embodiment of the invention is provided considering a case in which a frame transmitted from an opposite apparatus, which is provided on a mobile station of a mobile radio communication system, is lost, and the control signal apparatus request the switching over of a physical signal link before receiving a retransmission frame corresponding to the lost frame.

In such a case, a control signal processing apparatus according to the embodiment of the invention keeps a state where both of a frame corresponding to an original physical signal link and a frame corresponding to a target physical signal link can be received until the retransmission frame has been received.

According to this embodiment of the invention, it is possible to avoid to the utmost a frame loss which may be caused by switching over a physical signal link.

Furthermore, the invention provides a communication system comprising in a network a control signal processing apparatus which has a control function of managing establishment and maintenance of a physical signal link and a logical link, and sends and receives a frame containing a control signal through a physical link and a logical link which have been established, wherein;

said control signal processing apparatus is provided with a physical signal link switching-over means which switches over a physical signal link to be used in sending and receiving a control signal to a new physical signal link without releasing a logical link in response to a physical signal link switching-over request requiring to switch over a physical signal link to another physical signal link.

According to this invention, it is possible to switch over a physical signal link for exchanging a control signal between nodes in a network with a little overhead operation, and to effectively utilize resources.

BRIEF DESCRIPTION OF DRAWINGS

FIG. 8 shows a sequence at the time of originating a call from a mobile station in this embodiment.

BEST MODE FOR CARRYING OUT THE INVENTION

An embodiment of the invention is described with reference to the drawings in the following.

A: Structure of the Embodiment

Figure 1:
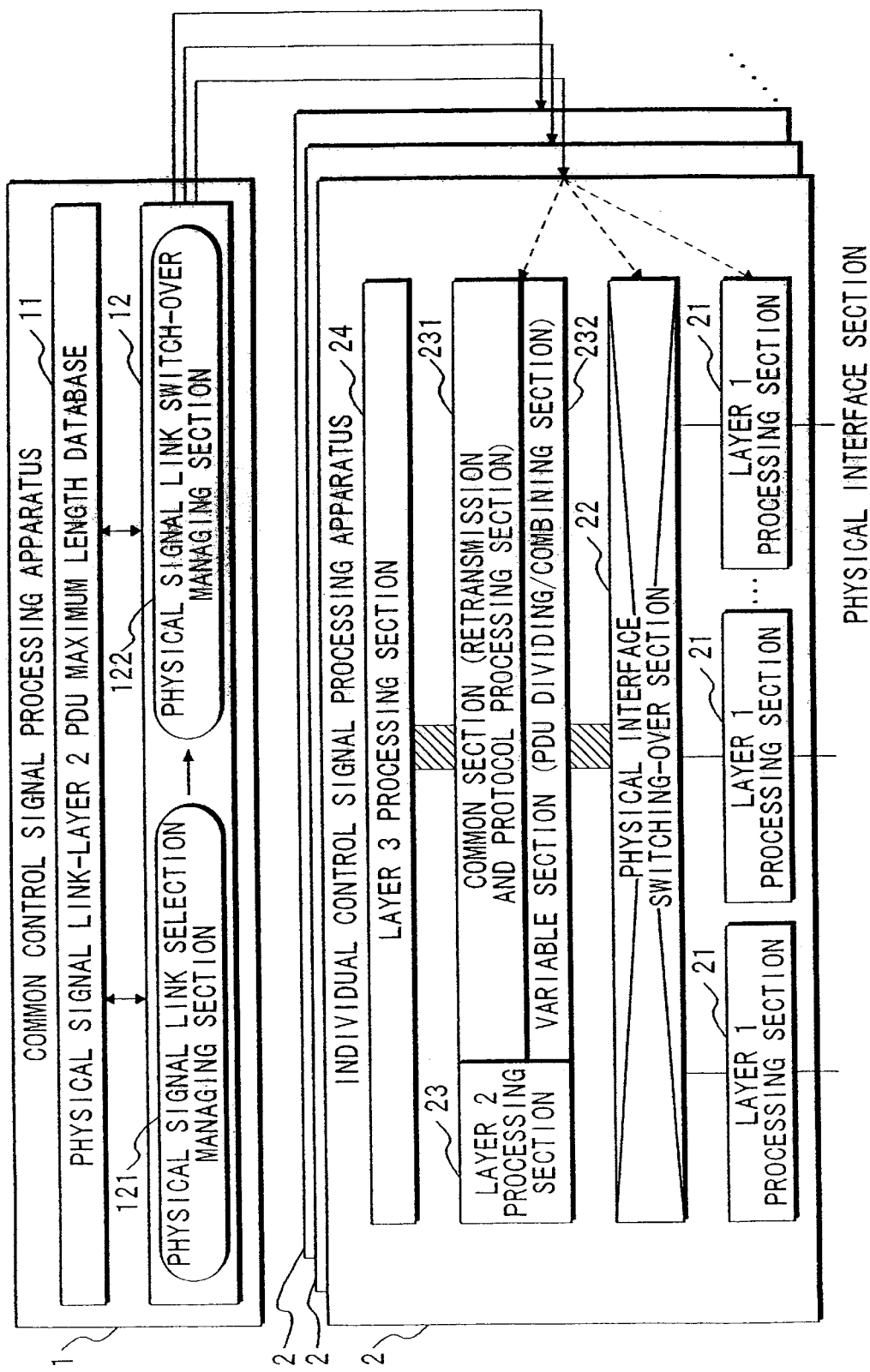
FIG. 1 is a block diagram showing the structure of a control signal processing apparatus according to a preferred embodiment of the present invention.

FIG. 1 is a diagram showing the structure of a control signal processing apparatus according to an embodiment of the present invention. A control signal processing apparatus shown in FIG. 1 is placed at a network side of a mobile radio communication system. A mobile station is provided with a control signal processing apparatus for exchanging control signals between itself and the control signal processing apparatus shown in FIG. 1. The control signal processing apparatus at a mobile station side has the same composition as that shown in FIG. 1 with respect to a terminating function of layer 2.

As shown in FIG. 1, a control signal processing apparatus according to this embodiment is composed of a common control signal processing apparatus 1 and a plurality of individual control signal processing apparatuses 2. Each one of the individual control signal processing apparatuses 2 corresponds to a single layer 2 link. The individual control signal processing apparatuses maybe integrated into one device instead of individually providing them.

The common control signal processing apparatus 1 and the respective individual control signal processing apparatuses 2 are actually composed of a PRU (processor unit) comprising a CPU (central processing unit), a ROM (read-only memory), a RAM (random access memory), and the like. These devices perform various functions by that a CPU executes a control program stored in the ROM or the RAM.

The common control signal processing apparatus 1 has a physical signal link-layer 2 PDU maximum length database 11 and a managing section 12.

The physical signal link-layer 2 PDU maximum length database 11 is a database which stores information indicating correlation between a plurality of physical signal links and the maximum lengths of the PDU (protocol data unit: layer 2 frame) of the layer 2 (data link layer) which are determined based on the abilities of the physical signal links.

The managing section 12 is means for managing a plurality of individual control signal processing apparatuses 2 with reference to this database 11. The managing section 12 has a physical signal link selection managing section 121 and a physical signal link switch-over managing section 122.

The physical signal link selection managing section 121 is means for selecting a target physical signal link for a layer 2 link (hereinafter referred to as an objective layer 2 link) when switching over the physical signal link corresponding to the objective layer 2 link is requested by an outside apparatus.

The physical signal link switch-over managing section 122 is means for supplying an indication to switch over a physical signal link to be used by an objective layer 2 link to a physical signal link selected by the physical signal link selection managing section 121 to an individual control signal processing apparatus corresponding to the objective layer 2 link.

On the other hand, the individual control signal processing apparatus 2 has a plurality of layer 1 processing sections 21, a physical interface switching-over section 22, a layer 2 processing section 23, and a layer 3 processing section 24.

Each layer 1 processing section 21 is connected with a physical interface section for providing an interface of a physical layer (layer 1), and starts or stops an operation according to an indication from the physical signal link switch-over managing section 122. This layer 1 processing section 21 forms a physical signal link using resources of the physical interface section during its operation.

The physical interface switching-over section 22 connects one or plural physical signal links to the layer 2 processing section 23 according to an indication from the physical signal link switch-over managing section 122.

The layer 2 processing section 23 is means for performing a process corresponding to a layer 2, and comprises a common section 231 and a variable section 232.

The common section 231 is means for performing a common process regardless to a physical signal link to be used, and has a protocol processing section for processing a protocol such as LAPDM (Link Access Procedure for D channel of Mobile radio communication) and the like, and a retransmission processing section for performing a retransmission process of data which has been missed in transmission.

On the other hand, the variable section 232 is means for performing a process corresponding to a physical signal link which is used. The variable section 232 combines the layer 2 PDUs delivered from the layer 1 side and delivers the PDUs thus combined to the common section 231, and divides data delivered from the common section 231 into data units having a maximum length equal to a maximum length stored in an internal maximum length storing section (not illustrated) to create layer 2 PDUs and delivers them to the layer 1 side.

The layer 3 processing section 24 is means for performing a process corresponding to the layer 3 (network layer).

B: Operation of the Embodiment

Next, operation of this embodiment is described.

B-1: Outline

First, an outline of operation of this embodiment at the time of establishing a layer 2 link and switching over a physical signal link is described.

When a message requesting establishment of a layer 2 link comes from the outside to the common control signal processing apparatus 1, a first physical signal link is selected by the physical signal link selection managing section 121.

Next, the maximum length (called as A) of a layer 2 frame corresponding to the first physical signal link is read out from the database 11 by the physical signal link selection managing section 121 or the physical signal link switch-over managing section 122.

The individual control signal processing apparatus 2 is notified of the information showing the first physical signal link and the information showing the maximum length A by the physical signal link switch-over managing section 122.

A first physical signal link (layer 1 processing section 21) corresponding to the information showing the first physical signal link is then selected by the physical interface switching-over section 22. In the PDU dividing/combining section of the variable section 232, the maximum length A is written in the maximum length storing section.

Next, when a message indicating to switch over a physical signal link to a second physical signal link comes to the common control signal processing apparatus 1, the same process as the process performed at the time of establishment of the first physical signal link as described above is performed by the common control signal processing apparatus 1, and the individual control signal processing apparatus 2 is notified of information showing the second physical signal link and information showing a maximum length B.

In the PDU dividing/combining section of the individual control signal processing apparatus 2, the maximum length B is written in the maximum length storing section.

In the physical interface switching-over section 22, a second physical signal link (layer 1 processing section 21 corresponding to the information showing the second physical signal link is selected, and the physical signal link is switched over from the first physical link to the second physical signal link.

At this time, the layer 2 link established when the first physical signal link is used is kept as it is and only the physical signal link is switched over. Therefore, an effect of switching over the physical signal link does not reach the upper layer (layer 3). Operation of this control signal processing apparatus will be described in detail in "B-3: Operation of the whole mobile radio communication system".

As described above, in this embodiment, since a physical signal link is switched over without releasing a layer 2 link, it is unnecessary to send and receive control signals for releasing and establishing the layer 2 link, and so an overhead operation can be reduced.

Furthermore, when switching over a physical signal link, the maximum length of a layer 2 frame corresponding to the ability of a physical signal link is acquired by inquiring of the database 11, and the layer 2 frames having a maximum length equal to this maximum length is transmitted and received. Therefore, layer 2 frames having the maximum length adapted to the physical signal link can be always transmitted and received throughout before and after switching over.

B-2: Switching-over Operation

Next, operation of switching over the first physical signal link to the second physical signal link is described with reference to FIGS. 2 to 7, paying attention to behavior of a layer 2 link. In description on and after these figures, ML3 (Mobile Layer 3: Mobile radio communication layer 3) is a layer for transmitting control signals and the like for mobile radio communication, being equivalent to said layer 3, and ML2 is a layer for transmitting control signals and the like for mobile radio communication, being equivalent to said layer 2. A control program to be stored in the ROM or RAM does not have to be one program, but one of several control programs may be performed. Accordingly, a typical operation of a control program adoptable in this embodiment is described in several cases.

(1) Switching-over Operation 1

Figure 2:
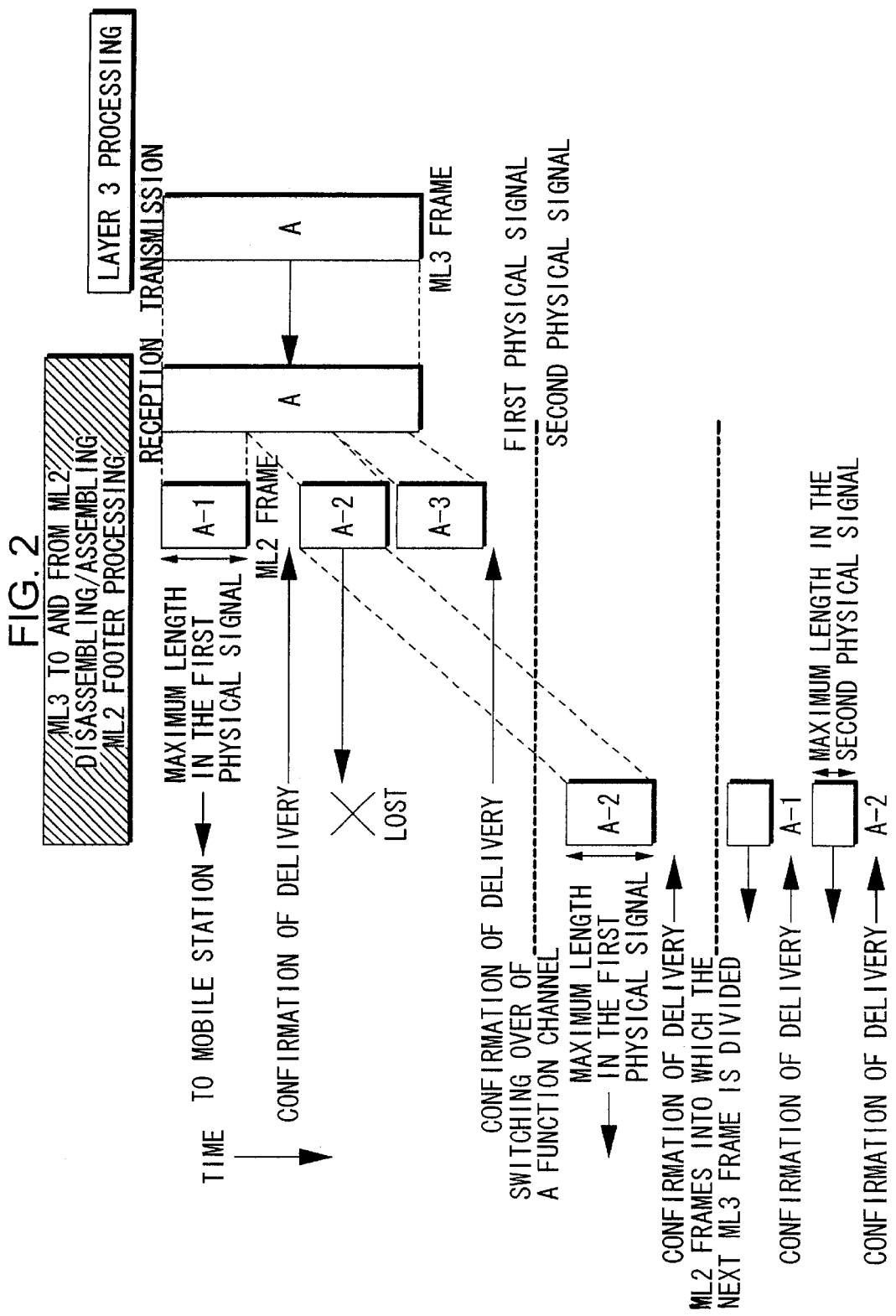
FIG. 2 shows a process of sending an ML2 frame according to an operation of switching over a physical signal link in this embodiment.

FIG. 2 shows a switching-over operation 1 performed in this embodiment.

Figure 3:
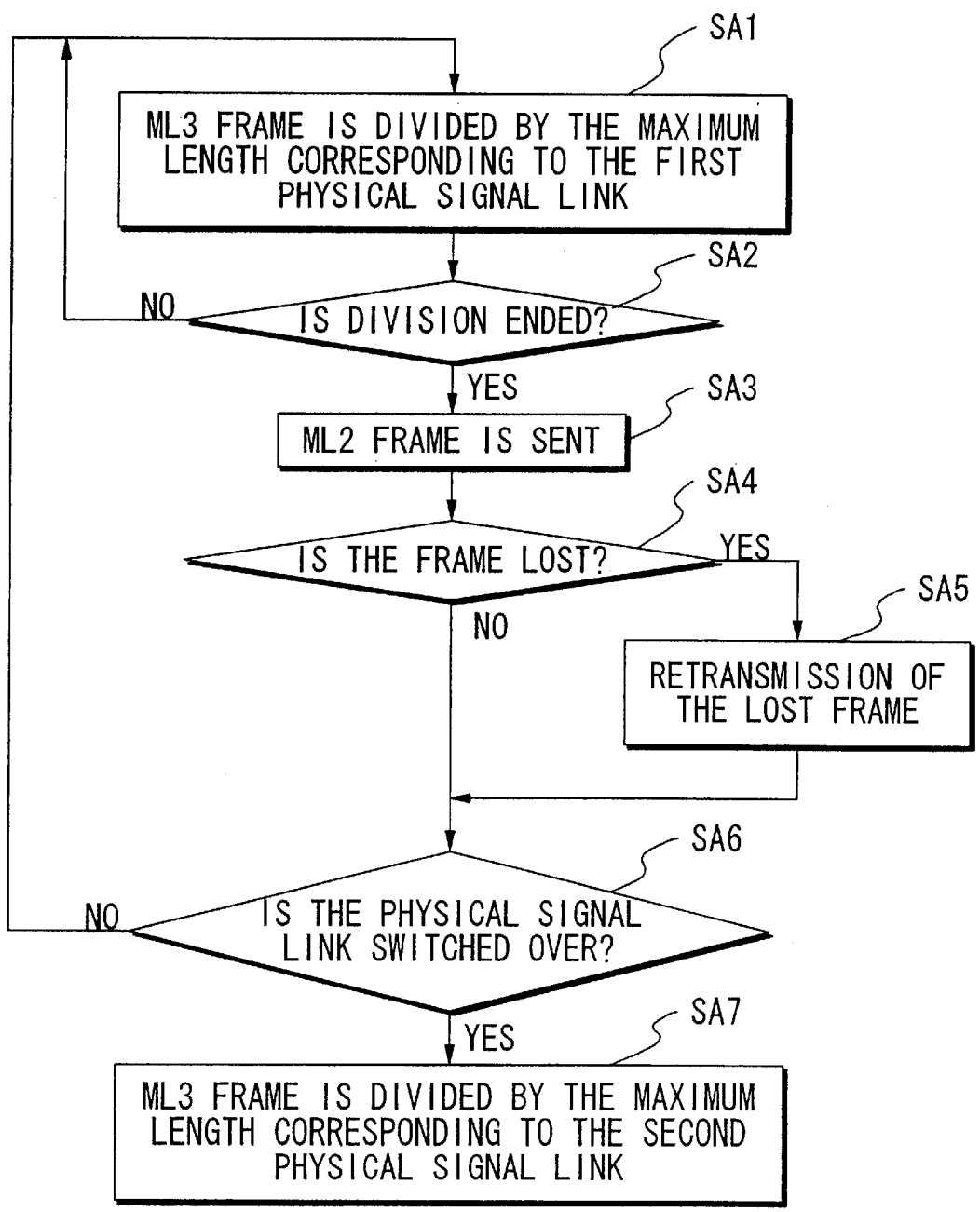
FIG. 3 is a flowchart showing the control flow of a switching-over operation corresponding to FIG. 2.

In this switching-over operation 1, plural ML2 frames are created by dividing one ML3 frame, and after the all ML2 frames have been transmitted, judgement is carried out with respect to a retransmission process of a lost frame or a switching-over process to a second physical signal link. FIG. 3 is a flowchart showing a control flow of the control signal processing apparatus for performing the switching-over operation 1. In this switching-over operation 1, it is assumed that the maximum length corresponding to each one of all physical signal links is determined independently of those of the other physical signal links but the maximum length is determined according to the ability of the physical signal link.

As shown in FIG. 2, when an ML3 frame A assembled in a layer 3 process by the layer 3 processing section 24 is delivered to the layer 2 processing section 23, a disassembling process for generating ML2 frames from the ML3 frame and an ML2 footer process are performed.

Concretely, a process of taking out an ML2 frame of a length (maximum length of the first physical signal link) written in the maximum length storing section of the PDU dividing/combining section from the ML3 frame A is repeated until the all information of the ML3 has been taken out and the ML3 frame has no ML2 frame to be taken out (steps SA1 and SA2 of FIG. 3).

Next, all ML2 frames A-1, A-2 and A-3 thus generated are sequentially transmitted (step SA3).

After this transmission has been ended, a judgement is made as to whether or not a frame loss has happened (step SA4).

When a frame loss has happened, a retransmission process for the lost frame is performed (step SA5). After this retransmission process, a judgement is made as to whether or not the physical signal link has been switched over (step SA6).

In case that no frame loss has happened, immediately after the step SA4 a judgment is performed with respect to switching over of the physical signal link (step SA6).

In the example shown in FIG. 2, since an ML2 frame A-2 has been lost, the frame is retransmitted. The first physical signal link is switched over to the second physical signal link before this retransmission process.

In this case, a layer 2 frame having a maximum length which corresponds to the first physical signal link and does not correspond to the second physical signal link is generated as a retransmission frame corresponding to the lost frame (ML2 frame A-2), and is retransmitted using the second physical signal link.

The reason why retransmission of a layer 2 frame lost before switching over a physical signal link is performed using a layer 2 frame having the maximum length corresponding to an original physical signal link is to simplify the control for retransmission by equalizing the length of the retransmission frame to that of the lost frame and by correlating the retransmission frame to the lost frame one by one.

When a physical signal link has been switched over from the first physical signal link to the second physical signal link and a receiver (mobile station) has not received a retransmission frame of a frame lost in transmission through the first physical signal link (in this example, an ML2 frame A-2), the receiver keeps an operational state for receiving not only frames having the maximum length corresponding to the second physical signal link but also frames having the maximum length corresponding to the first physical signal link.

When a retransmission frame having the maximum length corresponding to the first physical signal link has reached the mobile station through the second physical signal link, the mobile station sends confirmation of delivery of the lost frame to the network side.

In the example of FIG. 2, when the layer 2 processing section 23 of a control signal processing apparatus at the network side receives the confirmation of delivery of the lost frame, an ML3 frame delivered from the layer 3 processing section 24 is then divided by the maximum length of the second physical signal link to generate ML2 frames, and the ML2 frames are sequentially transmitted through the second physical signal link (step SA7).

In FIG. 3, processes after this are not illustrated, but actually the processes on and after the step SA2 where "first physical signal" is replaced with "second physical signal" are continued.

Furthermore, in FIG. 3, operation only at the time of transmission of an ML2 frame is shown. Operation at the time of reception of an ML3 frame will be described in detail in "B-3: Operation of the whole mobile radio communication system".

(2) Switching-over Operation 2

Figure 4:
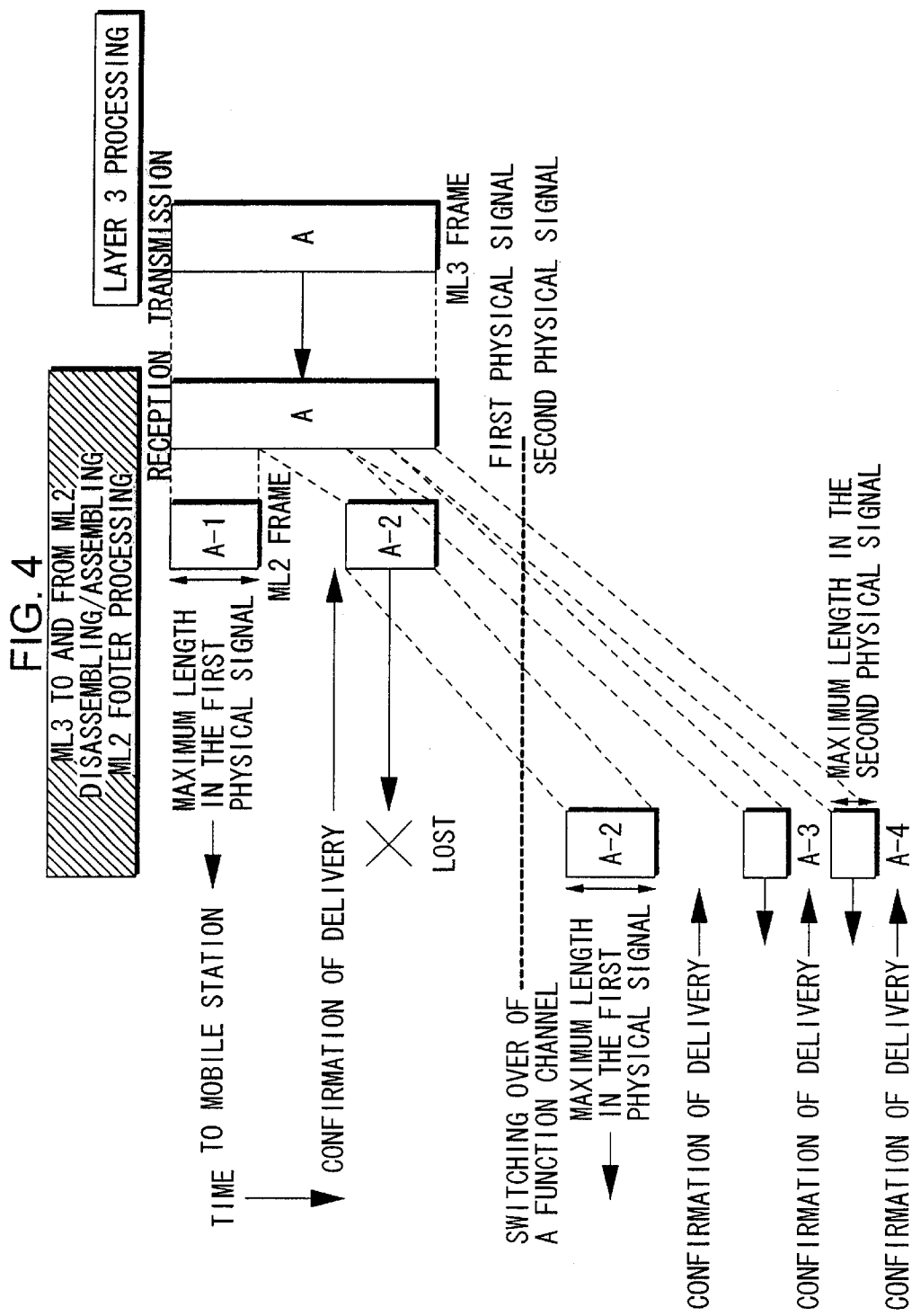
FIG. 4 shows a process of sending an ML2 frame according to an operation of switching over a physical signal link in this embodiment.
Figure 5:
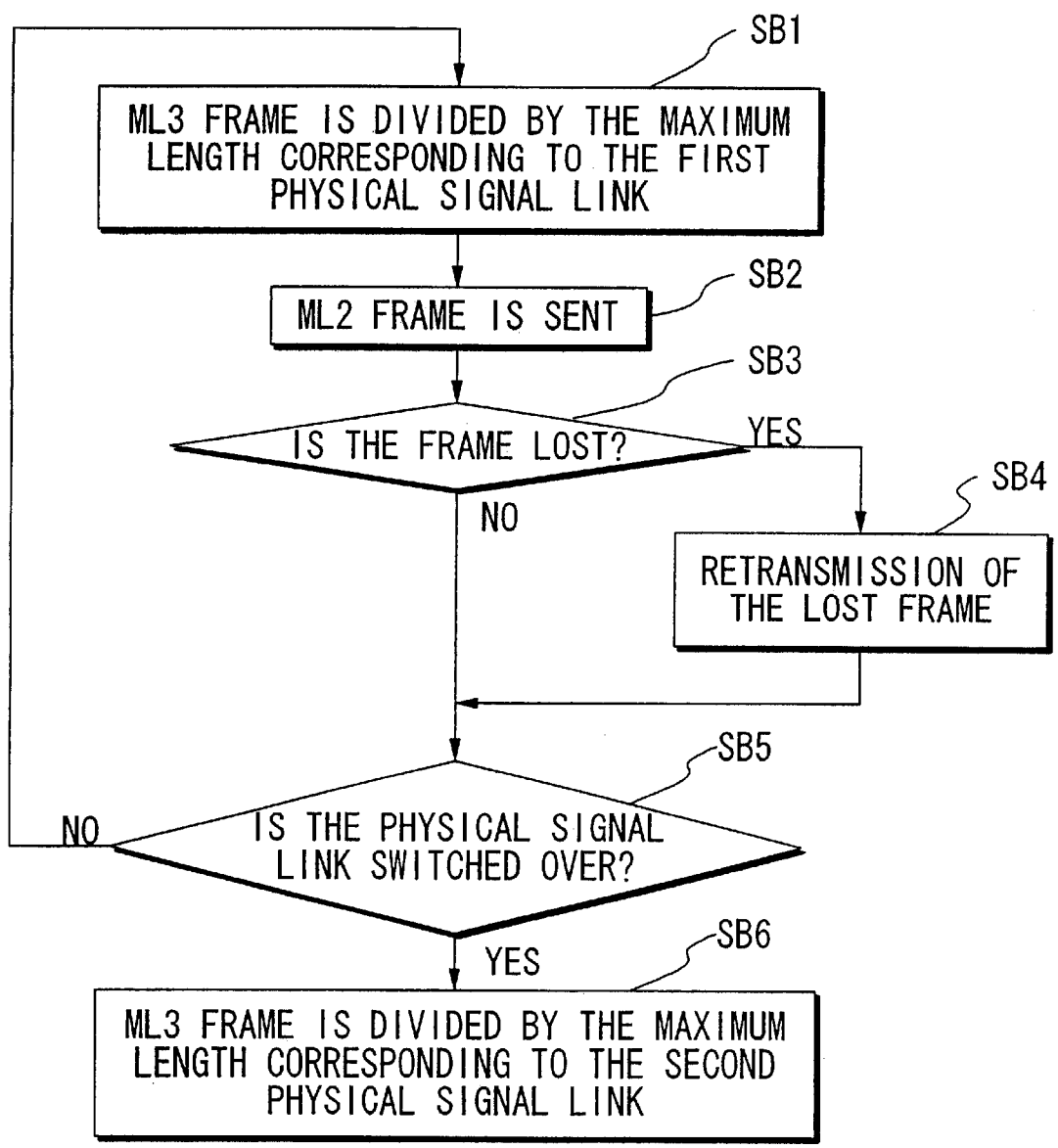
FIG. 5 is a flowchart showing the control flow of a switching-over operation corresponding to FIG. 4.

FIG. 4 shows a switching-over operation 2 in this embodiment. In this switching-over operation 2, plural ML2 frames are created by dividing one ML3 frame, and each time one of these ML2 frames is transmitted, a judgment is performed with respect to a retransmission process of a lost frame or a switching-over process to a second physical signal link. FIG. 5 is a flowchart showing a control flow for performing this switching-over operation 2. In this switching-over operation 2, it is assumed that the maximum length corresponding to each physical signal link is determined independently of those corresponding to the other physical signal links in the same way as the switching-over operation 1.

As shown in FIG. 4, when an ML3 frame A assembled in a layer 3 process by the layer 3 processing section 24 is delivered to the layer 2 processing section 23, a disassembling process for generating ML2 frames from the ML3 frame and an ML2 footer process are performed in the layer 2 processing section 23 (steps SB1 to SB5 of FIG. 5). Concretely, this is as follows.

First, the layer 2 processing section 23 takes out an ML2 frame A-1 having a maximum length equal to a length (maximum length of the first physical signal link) stored in the maximum length storing section of the PDU dividing/combining section from said ML3 frame A (step SB1). The layer 2 processing section 23 then transmits this taken-out ML2 frame through the first physical signal link (step SB2).

Next, in case that confirmation of delivery of the transmitted ML2 frame A-1 has been received, it is judged that no frame loss has happened (step SB3), and a judgement is made as to whether or not a physical signal link is to be switched over (step SB5). When the physical signal link has not switched over, the next ML2 frame A-2 is taken out and transmitted (steps SB1 and SB2).

By the way, in the example of FIG. 4, the ML2 frame A-2 has been lost. Therefore, a retransmission process for the lost frame is performed (step SB4). However, the first physical signal link has been switched over to the second physical signal link before this retransmission process. In this case, in the same way as the example shown in FIG. 2, the lost frame (ML2 frame A-2) having the maximum length corresponding to the first physical signal link is transmitted. Accordingly, operation of the receiver side is the same as the example of FIG. 2.

In the example of FIG. 4, when the layer 2 processing section 23 receives confirmation of reception of the lost frame, a part of the ML3 frame A which has not transmitted is divided by the maximum length of the second physical signal link to generate an ML2 frame A-3, and the ML2 frame thus generated is transmitted through the second physical signal link (step SB6). In FIG. 4, processes after this are not illustrated, but actually the processes on and after the step SB2 where "first physical signal" is replaced with "second physical signal" are continued.

(3) Switching-over Operation 3

Figure 6:
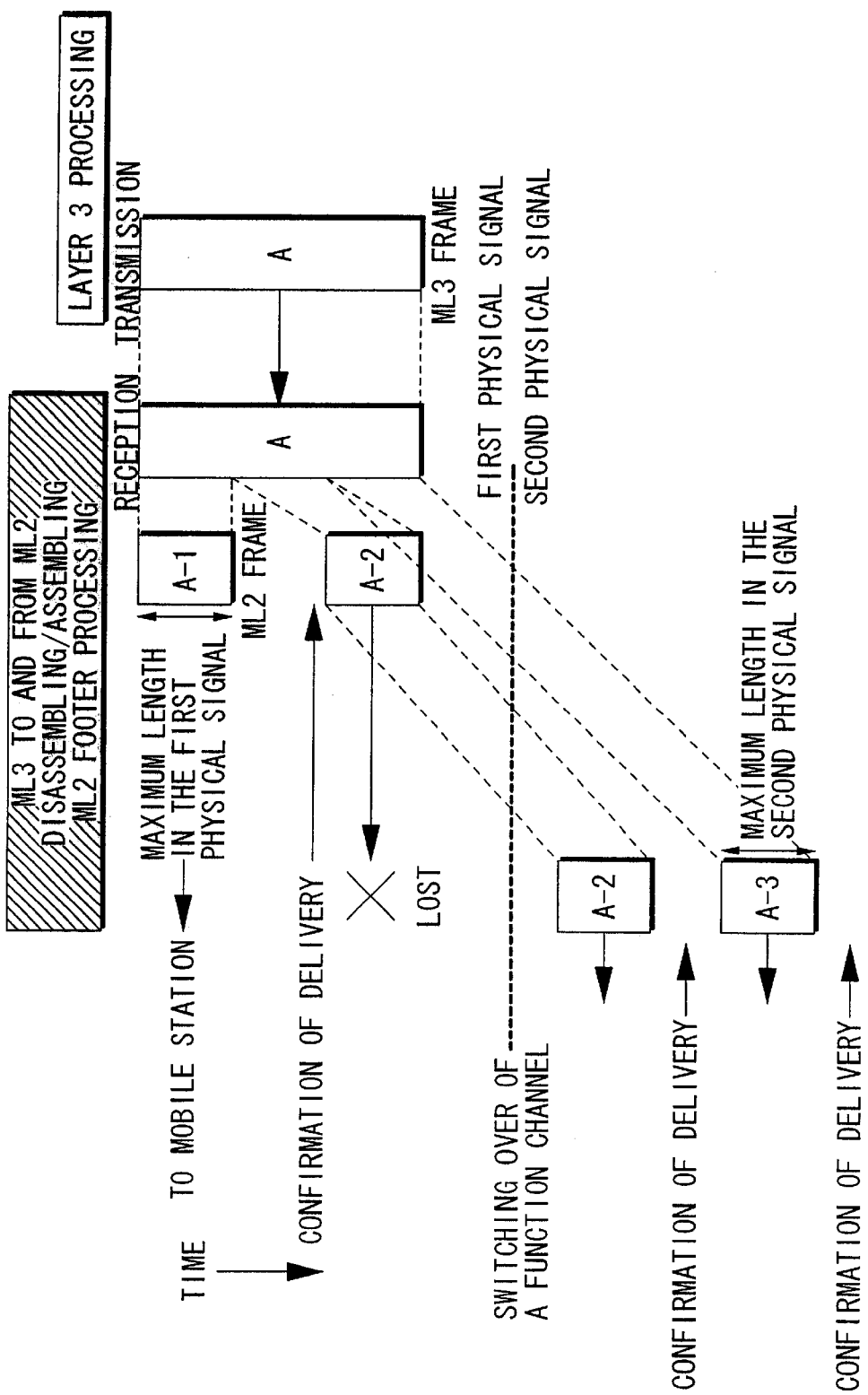
FIG. 6 shows a process of sending an ML2 frame according to an operation of switching over a physical signal link in this embodiment.
Figure 7:
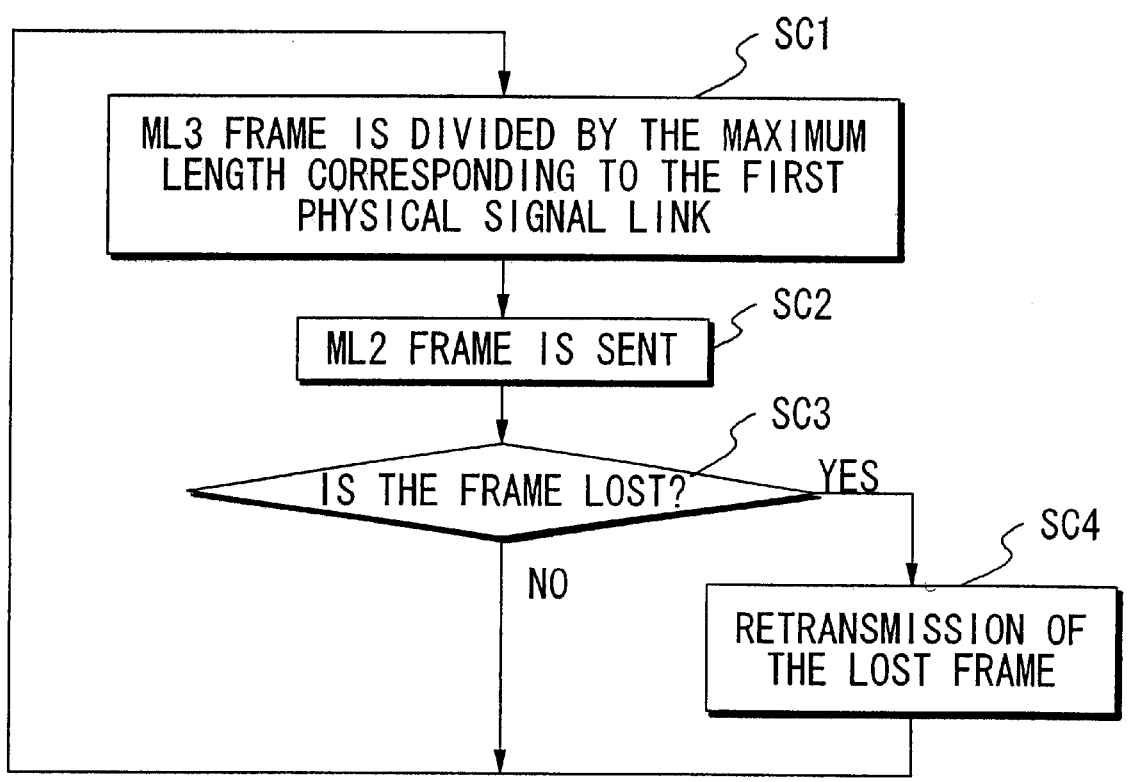
FIG. 7 is a flowchart showing the control flow of a switching-over operation corresponding to FIG. 6.

FIG. 6 shows a switching-over operation 3 in this embodiment. In this switching-over operation 3, one ML3 frame is divided into plural ML2 frames, and each time one of the ML2 frames is transmitted, operations for retransmission of a lost frame or switching over to the second physical signal link are performed. Furthermore, in this switching-over operation 3, it is assumed that maximum frame lengths corresponding to the all physical signal links have a same length. FIG. 7 is a flowchart showing a control flow for performing this switching-over operation 3.

In this switching-over operation 3, as shown in FIG. 6, the maximum length of the first physical signal link before switching over equals the maximum length of the second physical signal link after switching-over. Therefore, a control flow for controlling this switching-over operation 3 can be more simplified in comparison with said switching-over operation 2.

That is to say, as apparently known from comparing FIGS. 5 and 7 with each other, a process shown in FIG. 7 includes steps SC1 to SC4 of the same process as steps SB1 to SB4, but a process of switching over the maximum length of an ML2 frame according to switching over of a physical signal link (a process corresponding to steps SB5 and SB6 in FIG. 5) is cancelled.

In case that it is known in advance that the maximum length of an ML2 frame does not change at the time of switching over a physical signal link, a particular process is not necessary even if the first physical signal link is switched over to the second physical signal link before retransmission of a lost frame (ML2 frame A-2). Accordingly, as shown in FIG. 7, the process is simplified. However, since the frame length of an ML2 frame does not necessarily become a length adapted to the ability of a physical signal link being used, it is expected that the switching-over operation 3 is lower in throughput in comparison with said switching-over operations 1 and 2.

B-3: Operation of the Whole Mobile Radio Communication System

Next, a switching-over operation of the whole mobile radio communication system using a control signal processing apparatus according to the present invention. In this system, for example, a user's calling operation, a bearer switching-over operation and a plurality of calls are mentioned as an opportunity when a physical signal link is to be switched over. Outlines of them are described as follows.

a. Switching-over Process of a Physical Signal Link When a User Originates a Call In a mobile radio communication system, it is required to reduce a connection delay to a short time. Thereupon, in a next-generation mobile radio communication system, when a user originates a call, negotiations such as authentication and the like are quickly performed by allocating an individual high-speed physical signal link (SDCCH) for sending and receiving control signals. After confirmation of authentication and the like is finished and a TCH (Traffic Channel: information channel) has been established, the amount of control signals to be exchanged between a mobile station and the network side becomes less. Thereupon, after a TCH has been established, in order to effectively utilize radio resources, a physical signal link for exchanging control signals is to be switched over to an ACCH (Associated Control Channel) associated with the TCH. When a layer 2 link once established is released at the time of switching over the physical signal link for control signals, it is necessary to newly send and receive control signals for releasing and re-establishing the layer 2 link, and therefore the radio resources are wastefully used. Thereupon, in order to effectively utilize the radio resources, taking establishment of a TCH as an opportunity, the system generates a physical signal link switching-over request and switches over a physical signal link for control signals from an SDCCH to an ACCH without releasing a layer 2 link.

b. Switching-over Process of a Physical Signal Link When Changing a Bearer

Change of a user's application, namely, such change of a teleservice that a user performing a voice communication changes it to a facsimile communication as keeping the line is sometimes performed, and in such a case, change of a bearer is sometimes performed for reasons of restrictions of radio resources and the like. When this bearer change is performed, the structure of a radio frame is changed in a radio section and a bearer rate is changed, and so a TCH is re-established. Hereupon, control signals for controlling a voice communication or a facsimile communication are sent and received through an ACCH associated with the TCH. Therefore, when a TCH is switched over with switching over from a voice communication to a facsimile communication, naturally an ACCH also results in being switched over. Furthermore, since transmission is performed also in a wire section in the form of inheriting a radio frame as it is, it is necessary to change a physical signal link for control signals also in the wire section.

In addition to such a case of changing applications as described above, also in case of integrating bearers (for example, non-limited 64 kbps) and changing a bearer rate as leaving applications as they are, a bearer change is performed. For example, there is a case where the system provides a bearer of 64 kbps in rate when there are such non-limited data services at 64 kbps to 128 kbps and the network is congested, and where the system integrates two bearers of 64 kbps to provide a bearer of 128 kbps when the system comes to have a margin in resources. In this case also, since the rate of radio frames change, it is necessary to switch over the ACCH.

In such a case where a switching-over operation of an ACCH has happened as described above, the system generates a physical signal link switching-over request as described above and switches over the ACCH without releasing a layer 2 link.

c. Switching-over Process of a Physical Signal Link When a Plurality of Calls Happen In a next-generation mobile radio communication network, a service in which plural terminals are connected with one mobile station and plural calls are handled at the same time is under examination. In this case, an ACCH (Associated Control Channel) associated with the TCH of a first call is shared with and used by all calls. However, there is a case in which the first call ends although another call is continued. In this case, if no measure is taken, the ACCH disappears due to end of the first call, and so control signals for the remaining calls cannot be sent and received. Thereupon, in such a case, the system generates a physical signal link switching-over request as described above, establishes an ACCH in the TCH of one of the remaining calls without releasing the layer 2 links corresponding to the remaining calls, and continues sending and receiving control signals for keeping the remaining calls by using this ACCH.

Hereupon, taking out from the opportunities a to c a switching-over operation of a physical signal link when a user originates a call, an example of the switching-over operation is described. In an example described below, a trigger for switching over a physical signal link is given by an indication from the ML3 processing section (layer 3 processing section 24).

In FIG. 8, MS designates a mobile station, BTS designates a base station, and MSC designates a mobile radio communication exchange station. A mobile radio communication exchange station MSC comprises an RNC (Radio Access Network Controller). The RNC includes an apparatus M-SIG (a signal-to-mobile-station processing apparatus) at the network side for terminating signals transmitted to or received from a mobile station, namely, an apparatus corresponding to an individual control signal processing apparatus according to this embodiment. Although there is a case that an MSC does not include an RNC and an RNC is provided separately from the MSC, in such a case also, an apparatus M-SIG is provided on the RNC. A mobile station also comprises a control signal processing apparatus (not illustrated) for sending and receiving control signals, being opposite to this M-SIG.

As shown in FIG. 8, when a mobile station originates a call, the following processes (1) to (4) are performed in sequence. The following processes (1) to (4) respectively correspond to processes (1) to (4) shown in FIG. 8.

(1) A PRU of an apparatus M-SIG at the network side, provided in an exchange station MSC receives a trigger message (Signaling Channel Setup request indication) requesting establishment of a temporary physical signal link (first physical signal link) for performing a process such as authentication and the like from a mobile station MS. The RPU then establishes a first physical signal link in response to the trigger message. This first physical signal link is an SDCCH, for example.

More specifically, the PRU receives a message according to the trigger message (Signaling Channel Setup requested request indication) from a base station BTS, and establishes a first physical signal link in response to the message thus received.

When this first physical signal link is established, the mobile station MS performs a process such as authentication and the like, using the first physical signal. As a result, a layer 2 link is established and an ML2 frame is sent and received through the first physical signal link.

(2) When such a process as authentication and the like using the first physical signal link has been finished, the PRU of the apparatus M-SIG starts a process of switching over the control channel from the first physical signal to the second physical signal. That is to say, the PRU of the apparatus M-SIG sends a message (Bearer & Radio Bearer Setup request indication) requesting establishment of a link for the second physical signal in a wire section from a mobile radio communication exchange station MSC to a base station BTS. The second physical signal link is an ACCH associated with a TCH for example.

At this time, the apparatus M-SIG is in a state of performing transmission of control signals using the first physical link.

When the second physical signal link in a wire section has been established, the PRU of the apparatus M-SIG sends a trigger message (Radio Beare Setup request indication) for establishing a second physical signal link in a radio section through the first physical signal link from the mobile radio communication exchange station MSC to the mobile station MS. By sending this trigger message, the apparatus M-SIG comes to be in a multi-reception state where it can receive control signals using both of the first physical link and the second physical signal link.

(3) When a message (Bearer & Radio Bearer Setup response confirmation) indicating that a radio link corresponding to the second physical signal has been established is sent from the base station BTS to the mobile radio communication exchange station MSC, the PRU of the apparatus M-SIG is triggered by this message and then switches over a link to be used in transmission from the first physical signal link to the second physical signal link. At this time, however, the reception state is left as a multi-reception state for receiving the first physical signal and the second physical signal.

Hereupon, the reason why the apparatus M-SIG is kept in a multi-reception state is described.

For example, suppose a case in which a link for reception is switched over from the first physical signal link to the second physical signal link in transmission when a link for transmission is switched over from the first physical signal link to the second physical signal link. In this case, if a trigger message for switching over from the first physical signal link to the second physical signal link (a message indicating that a radio link for the second physical signal has been established) reaches the mobile exchange station MSC before a user message being transmitted through the first physical signal link from the mobile station, and if the switching over has been performed in reception, there is a possibility that the user data which have reached through the first physical signal link cannot be received by the mobile exchange station MSC. Furthermore, in this case, retransmission of the lost data is performed through the second physical signal link, and as a result the throughput is lowered. In order to prevent these troublesome, a multi-reception state is kept even if switching over a physical signal link to be used in transmission.

Next, the apparatus M-SIG releases the first physical signal link by sending a message (Signaling Connection Release release request indication) requesting release of the first physical signal link to the base station.

(4) The apparatus M-SIG receives as trigger a release confirmation message (Signal Connection Release response confirmation) showing that the first physical signal link has been released, and the apparatus M-SIG then switches over a physical signal link to be used in reception of control signals to only the second physical signal link.

That is to say, a physical signal link to be used in transmission and reception becomes only the second physical signal link.

Since a physical signal link is switched over in such a procedure as described above, it is possible to avoid to the utmost a frame loss which may be caused by a switching-over operation.

What is claimed is:

1. A control signal processing apparatus which has a control function for managing establishment and maintenance of a physical signal link and a logical link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an already established logical link, in response to a physical signal link switching-over request requiring switch over from one physical signal link to another physical signal link, including the steps of requesting establishment of a target physical signal link without releasing the logical link, starting reception of a control signal using both of the target physical signal link and an original physical signal link, switching over a physical signal link to be used in transmission of a control signal from the original physical signal link to the target physical signal link and requesting release of the original physical signal link when confirming the establishment of the target physical signal link, and switching over the physical signal link to be used in reception of a control signal from the original physical signal link to the target physical signal link when confirming the release of the original physical signal link; and a layer 2 processing section for performing processing for said logical link, said layer 2 processing section performing necessary processing for said logical link even though said switching over to said another physical signal link is being performed.

2. A control signal processing apparatus which has a control function for managing establishment and maintenance of a physical signal link and a logical, link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an already established logical link, in response to a physical signal link switching-over request requiring switch over from one physical signal link to another physical signal link;

a database for storing a maximum frame length corresponding to each of a plurality of available physical signal links;

selecting means for selecting a target physical signal link in response to said physical signal link switching-over request; and a layer 2 processing section for performing processing for said logical link, said layer 2 processing section performing necessary processing for said logical link even though said switching over to said another physical signal link is being performed;

wherein said layer 2 processing section comprises transmitting means for obtaining the maximum frame length corresponding to said target physical signal link from said database and for transmitting one or more frames having the maximum length and including the control signal.

3. A control signal processing apparatus as defined in claim 2, wherein said transmitting means transmits a retransmission frame which has the maximum length corresponding to the original physical signal link and containing information put on a lost frame using with the target physical signal link when the physical signal link switching-over request is given before performing retransmission of the lost frame.

4. A control signal processing apparatus as defined in claim 3, wherein;

said maximum frame length of each physical signal link is determined based on an ability of the physical signal link.

5. A control signal processing apparatus which has a control function for managing establishment and maintenance of a physical signal link and a logical link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an-already established logical link, in response to a physical signal link switching-over request requiring switch over from one physical signal link to another physical signal link; and a layer 2 processing section for performing processing for said logical link, said layer 2 processing section performing necessary processing for said logical link even though said switching over to said another physical signal link is being performed;

wherein, when a frame transmitted from an opposite apparatus is lost and the control signal processing apparatus performs a physical signal link switching-over request before receiving a retransmission frame corresponding to the lost frame said physical signal link switching-over means remains in a state in which it is capable of receiving both a frame corresponding to an original physical signal link and a frame corresponding to a target physical signal link until the retransmission frame is received.

6. A control signal processing apparatus, which has a control function for managing establishment and maintenance of a physical signal link and a logical link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an already established logical link, in response to a physical signal link switching-over request requiring switch over from one physical signal link to another physical signal link; and a layer 2 processing section for performing processing for said logical link, said layer 2 processing section performing necessary processing for said logical link even though said switching over to said another physical signal link is being performed;

wherein the control signal processing apparatus generates said physical signal link switching-over request to switch over a physical signal link for sending and receiving a control signal to a target physical signal link having a less capacity when a call is originated and an information channel has been established.

7. A control signal processing apparatus which has a control function for managing establishment and maintenance for a physical signal link and a logical link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an already established logical link, in response to a physical signal link switching-over request requiring switch over from one physical signal link to another physical signal link; and a layer 2 processing section for performing processing for said logical link, said layer 2 processing section performing necessary processing for said logical link even though said switching over to said another physical signal link is being performed;

wherein the control signal processing apparatus generates the physical signal link switching-over request to switch over a physical signal link for sending and receiving a control signal to a link corresponding to a new bearer when performing a bearer switching-over operation.

8. A control signal processing apparatus which has a control function for managing establishment and maintenance of a physical signal link and a logical link and which sends and receives a frame containing a control signal through a physical link and a logical link which have been established, said control signal processing apparatus comprising:

physical signal link switching-over means for switching over a physical signal link to be used in transmission and reception of control signals to a new physical signal link while holding an already established logical link, in response to a physical signal link switching-over request requiring switch over from one physical signal link to another physical signal link; and a layer 2 processing section for performing processing for said logical link, said layer 2 processing section performing necessary processing for said logical link even though said switching over to said another physical signal link is being performed;

wherein when a plurality of calls are in communication and a call using a physical signal link for sending and receiving a control signal has been ended, the control signal processing apparatus generates the physical signal link switching-over request to switch over the physical signal link to another physical signal link corresponding to one of the remaining calls.

\* \* \* \* \*

UNITED STATES PATENT AND TRADEMARK OFFICE
CERTIFICATE OF CORRECTION

PATENT NO. : 6,611,505 B1
DATED : August 26, 2003
INVENTOR(S) : Shin Nakamura et al.

It is certified that error appears in the above-identified patent and that said Letters Patent is hereby corrected as shown below:

Column 13,
Line 28, immediately after "and a logical" delete "," (comma).

Column 14,
Line 14, delete "an-already" and substiute -- an already --;
Line 27, immediately after "the lost frame" insert -- , -- (comma).

Signed and Sealed this

Seventeenth Day of August, 2004

JON W. DUDAS
*Acting Director of the United States Patent and Trademark Office*